US008551668B2

(12) United States Patent
Buche et al.

(10) Patent No.: US 8,551,668 B2
(45) Date of Patent: Oct. 8, 2013

(54) SEALING OF A MEMBRANE ELECTRODE ASSEMBLY (71) Applicant: Johnson Matthey Fuel Cells Limited, London (GB)

(72) Inventors: Silvain Buche, Reading (GB); Adam John Hodgkinson, Swindon (GB); Catherine Helen de Rouffignac, Oxford (GB); Jonathan David Brereton Sharman, Oxon (GB)

(73) Assignee: Johnson Matthey Fuel Cells Limited, London (GB)

( * ) Notice: Subject to any disclaimer, the term of this patent is extended or adjusted under 35 U.S.C. 154(b) by 0 days.

(21) Appl. No.: 13/653,847

(22) Filed: Oct. 17, 2012

(65) Prior Publication Data

US 2013/0040228 A1   Feb. 14, 2013

Related U.S. Application Data (62) Division of application No. 10/569,188, filed as application No. PCT/GB2004/003334 on Aug. 2, 2004, now Pat. No. 8,309,268.

(30) Foreign Application Priority Data

Aug. 22, 2003   (GB) .................................. 0319780.3

(51) Int. Cl.
*H01M 8/10* (2006.01)
*H01M 2/14* (2006.01)
*H01M 4/02* (2006.01)

(52) U.S. Cl.
USPC ............ 429/480; 429/483; 429/510; 429/534

(58) Field of Classification Search
USPC .................. 429/452, 463, 479–483, 492–494, 429/507–510, 523, 532, 534–535; 427/115; 502/101
See application file for complete search history.

(56) References Cited

U.S. PATENT DOCUMENTS

| 5,187,025 A | 2/1993 | Kelland et al. |
| 5,464,700 A | 11/1995 | Steck et al. |
| 6,080,503 A | 6/2000 | Schmid et al. |
| 6,475,656 B1 | 11/2002 | Koschany et al. |
| 6,756,147 B1 | 6/2004 | Bronold et al. |
| 6,815,114 B1 | 11/2004 | Bronold et al. |

(Continued)

FOREIGN PATENT DOCUMENTS

| EP | 0 273 427 B1 | 7/1988 |
| EP | 0 875 524 B1 | 11/1998 |

(Continued)

OTHER PUBLICATIONS

JPO IPDL machine translation of JP2003068332, published on Mar. 7, 2003, retrieved on Apr. 26, 2010.

(Continued)

*Primary Examiner* — Barbara Gilliam
*Assistant Examiner* — Claire L Roe
(74) *Attorney, Agent, or Firm* — RatnerPrestia (57) ABSTRACT A sealed and/or reinforced membrane electrode assembly is disclosed. Encapsulation films, each comprising a backing layer and an adhesive layer, are positioned on the edges of at least one face of each gas diffusion substrate such that the adhesive layers impregnate into each gas diffusion substrate. Methods of forming sealed and/or reinforced membrane electrode assemblies are also disclosed.

15 Claims, 5 Drawing Sheets

(56) References Cited

U.S. PATENT DOCUMENTS

| | | |
|---|---|---|
| 7,226,685 B2 | 6/2007 | Kuroki et al. |
| 2001/0001052 A1 | 5/2001 | Bonk et al. |
| 2001/0055710 A1 | 12/2001 | Saito et al. |
| 2002/0160252 A1 | 10/2002 | Hirahara et al. |
| 2003/0235744 A1 | 12/2003 | Pflaesterer |
| 2006/0073385 A1 | 4/2006 | Andrin et al. |
| 2008/0050295 A1 | 2/2008 | Uchida et al. |

FOREIGN PATENT DOCUMENTS

| | | | |
|---|---|---|---|
| EP | 1 320 142 A2 | | 6/2003 |
| EP | 1 320 142 A3 | | 6/2003 |
| EP | 1 341 249 A1 | | 9/2003 |
| JP | 11-329454 A | | 11/1999 |
| JP | 2001-015127 A | | 1/2001 |
| JP | 2002-329512 A | | 11/2002 |
| JP | 2003-068332 A | | 3/2003 |
| WO | WO-00/26975 | | 5/2000 |
| WO | WO-00/74160 A1 | | 12/2000 |
| WO | WO-02/25753 A1 | | 3/2002 |
| WO | WO-02/43172 A1 | | 5/2002 |
| WO | WO-02/093669 A2 | | 11/2002 |
| WO | WO-03/061931 A2 | | 7/2003 |

OTHER PUBLICATIONS

JPO IPDL machine translation of JP11329454, published on Nov. 30, 1999, retrieved on Apr. 26, 2010.

iii)

iii)

iii)

SEALING OF A MEMBRANE ELECTRODE ASSEMBLY

CROSS-REFERENCE TO RELATED APPLICATIONS

This application is a division of U.S. patent application Ser. No. 10/569,188, now U.S. Pat. No. 8,309,268, filed Sep. 20, 2006, which is the U.S. National Phase application of PCT International Application No. PCT/GB2004/003334, filed Aug. 2, 2004, and claims priority of British Patent Application No. 0319780.3, filed Aug. 22, 2003, the disclosures of all of which are incorporated herein by reference in their entireties for all purposes.

FIELD OF THE INVENTION

The present invention relates to a membrane electrode assembly suitable for use in a polymer electrolyte membrane fuel cell wherein the edge of the membrane electrode assembly is sealed and/or reinforced using encapsulation films.

BACKGROUND OF THE INVENTION

A fuel cell is an electrochemical cell comprising two electrodes separated by an electrolyte. A fuel, e.g. hydrogen or methanol, is supplied to the anode and an oxidant, e.g. oxygen or air, is supplied to the cathode. Electrochemical reactions occur at the electrodes, and the chemical energy of the fuel and the oxidant is converted to electrical energy and heat. Fuel cells are a clean and efficient power source, and may replace traditional power sources such as the internal combustion engine in both stationary and automotive power applications.

In a polymer electrolyte membrane (PEM) fuel cell, the electrolyte is a solid polymer membrane which is electronically insulating but ionically-conducting. Proton-conducting membranes based on perfluorosulphonic acid materials are typically used, and protons, produced at the anode, are transported across the membrane to the cathode, where they combine with oxygen to create water.

The principle component of a polymer electrolyte fuel cell is known as a membrane electrode assembly (MEA) and is essentially composed of five layers. The central layer is the polymer membrane. On either side of the membrane there is an electrocatalyst layer, containing an electrocatalyst, which is tailored for the different requirements at the anode and the cathode. Finally, adjacent to each electrocatalyst layer there is a gas diffusion substrate. The gas diffusion substrate must allow the reactants to reach the electrocatalyst layer and must conduct the electric current that is generated by the electrochemical reactions. Therefore the substrate must be porous and electrically conducting.

The MEA can be constructed by several methods. The electrocatalyst layer may be applied to the gas diffusion substrate to form a gas diffusion electrode. Two gas diffusion electrodes can be placed either side of a membrane and laminated together to form the five-layer MEA. Alternatively, the electrocatalyst layer may be applied to both faces of the membrane to form a catalyst coated membrane. Subsequently, gas diffusion substrates are applied to both faces of the catalyst coated membrane. Finally, an MEA can be formed from a membrane coated on one side with an electrocatalyst layer, a gas diffusion substrate adjacent to that electrocatalyst layer, and a gas diffusion electrode on the other side of the membrane.

Typically tens or hundreds of MEAs are required to provide enough power for most applications, so multiple MEAs are assembled to make up a fuel cell stack. Field flow plates are used to separate the MEAs. The plates perform several functions: supplying the reactants to the MEAs, removing products, providing electrical connections and providing physical support. The field flow plates and MEAs in the stack are compressed together at pressures typically from 50 to 200 psi absolute, using for example a bladder or piston system or a series of bolts located in stack end plates. Typically, one of the stack end plates also contains the necessary ports to provide access and removal from the stack of the reactants, products and any associated humidification water. Ports are also required to provide access to and removal of the stack coolant from the stack cooling plates which are needed to remove the excess heat generated within the MEAs. From the ports in the stack end plate the gases and fluids are transported through the stack to each field flow plate. The porting design may require that internal sections of each MEA are removed or all the porting may be external of the MEAs.

In the fuel cell stack it is essential that any loss to the atmosphere or any potential mixing of the reactants is prevented. This would lead to a decrease in the overall system efficiency and is a potentially hazardous situation due to the risk of combustion from the mixing of the fuel and oxidant. Sealing and gasketing of the components in the stack are used for the purpose of preventing such occurrences. For the purposes of this description, the term "sealing" is used to denote a method of preventing fluid diffusion out of or through a single component. For example, the perimeter of a gas diffusion substrate can be sealed by impregnating the perimeter with a sealant material. The term "gasketing" is used to denote a method of preventing fluid diffusion between components by placing a resilient material between the two components.

In a well-known method of sealing and gasketing the components in a fuel cell stack the membrane protrudes beyond the gas diffusion substrates by a considerable margin, e.g. by as much as 25 mm, so that gaskets can be positioned between the protruding membrane and the field flow plates. The gaskets are held in place by compression. This method can be problematic, particularly with the very thin membranes (approximately 30 μm) that are increasingly being used, because the membrane is weak and may be damaged by the compressive forces. Additionally it is wasteful to use large amounts of expensive membrane material in regions outside the active area of the membrane electrode assembly.

Membrane electrode assemblies are generally not very strong, and an assembly with a protruding membrane will have a particularly weak edge region. This can cause difficulties when handling membrane electrode assemblies, and when constructing the fuel cell stack.

U.S. Pat. No. 5,187,025 describes a membrane electrode assembly wherein the problem of gasketing directly onto the membrane is avoided and wherein the strength of the edge region of the membrane electrode assembly is improved. A plastic spacer surrounds the membrane and plastic films with an adhesive layer are bonded to both sides of the spacer and the membrane. This provides a rigid frame around the membrane and effects a gas tight seal around the membrane edge. WO 00/74160 discloses another membrane electrode assembly wherein a reinforcing frame is provided by plastic films with adhesive layers that are bonded to the membrane. The adhesive layers extend beyond the membrane and a strong bond is formed between the two adhesive layers.

In these previous examples the plastic films and adhesive layers are bonded to the membranes. Membrane materials undergo changes in size depending on their level of hydration. If the membrane is constrained by a rigid frame formed by plastic films and adhesive layers, changes in hydration may lead to stress on the membrane and possible damage.

WO 00/74160 discloses that the plastic films can be embedded in the gas diffusion substrates, but there is no disclosure of sealing or reinforcing the edge of a membrane electrode assembly by applying the plastic film and adhesive layer to the substrate.

SUMMARY OF THE INVENTION

Accordingly the present invention provides a membrane electrode assembly comprising a polymer electrolyte membrane, electrocatalyst layers disposed either side of the membrane and gas diffusion substrates contacting each of the electrocatalyst layers, wherein encapsulation films, each comprising a backing layer and an adhesive layer, are positioned on the edges of at least one face of each gas diffusion substrate such that the adhesive layers impregnate into each gas diffusion substrate.

BRIEF DESCRIPTION OF THE DRAWINGS

For a more complete understanding of the invention, reference is made to the schematic drawings wherein.

DETAILED DESCRIPTION OF THE INVENTION

The present inventors have found that a membrane electrode assembly can be sealed and/or reinforced by applying encapsulation films to gas diffusion substrates. Encapsulation films are commonly used in binding and laminating processes and have a backing layer and an adhesive layer. In the present invention the adhesive layer impregnates the gas diffusion substrate.

The adhesive layers do not have to impregnate through the entire thickness of the substrate, although this may be preferred in particular embodiments. Suitably the adhesive layer impregnates through at least 25% of the thickness of the substrate, preferably at least 40%. The adhesive layer may also be thicker than the substrate so that it impregnates through the entire thickness of the substrate and protrudes beyond the face of the substrate.

Suitably the entire adhesive layer impregnates into the substrate such that the backing layers contact the at least one face of each gas diffusion substrate.

The encapsulation films are positioned on the edges of at least one face of each gas diffusion substrate. If the MEA has internal porting, there may be edges within the assembly and not just around the periphery. Suitably the encapsulation films cover a region that is within less than 15 mm of the edge of the substrates, preferably less than 8 mm.

The encapsulation films have a backing layer which is suitably a non-conducting self-supporting film material. The backing layers do not impregnate the gas diffusion substrates, and suitably contact the gas diffusion substrates. Suitably the backing layer is non-adhesive. The melting temperature of the backing film must be higher than the temperatures used when manufacturing the membrane electrode assembly (e.g. lamination temperatures), and preferably the backing layer shows no appreciable film softening at the manufacturing temperatures. Preferably the backing layer does not shrink appreciably under the manufacturing conditions.

The backing layer is suitably made of a material that does not leach contaminants into the fuel cell system, and that has low permeability to hydrogen, oxygen and water (suitably lower than the permeability of the polymer electrolyte membrane). Additionally, the material of the backing layer is preferably resistant to puncture by fibres from the gas diffusion substrate.

The backing layer is preferably a polymeric material such as polyethylene terephthalate (PET), polyvinylidene fluoride (PVDF), biaxially-oriented polypropylene (BOPP), polytetrafluoroethylene (PTFE), ethylene tetrafluoroethylene (ETFE), polyether sulphone (PES), polyether ether ketone (PEEK), fluorinated ethylene-propylene (FEP), polyphenylene sulphide (PPS) or polyimide (PI). The backing layer could also be a metallised film, i.e. a thin layer of metal coated with polymer. The thickness of the backing layer is suitably greater than 1 µm, preferably between 5 µm and 50 µm.

The encapsulation films have an adhesive layer which is, for example, a polyethylene-based or polypropylene-based adhesive. The adhesive layer may contain a hot-melt adhesive, a pressure-sensitive adhesive or a thermosetting adhesive. The adhesive may be a copolymer of ethylene and methacrylic acid or a copolymer of ethylene and vinyl acetate, as described in U.S. Pat. No. 6,756,147. The adhesive must be sufficiently fluid to impregnate the substrate. Preferably there is no softening of the adhesive layer at temperatures below 100° C. Preferably the adhesive layer does not shrink appreciably under manufacturing conditions. Suitably the adhesive layer is made of a material that does not leach contaminants into the fuel cell system.

Suitably the encapsulation films have only one adhesive layer, on one side of the backing layer, but in certain embodiments it may be preferable to have adhesive layers on both sides of the backing layer. If the film has two adhesive layers, only one of these layers will impregnate the gas diffusion substrate. The adhesive layers may contain the same or different adhesives.

The thickness of the adhesive layer is suitably from 1 µm to 300 µm, preferably from 20 µm to 300 µm. However, if the encapsulation film has two adhesive layers, the thickness of the adhesive layer that will ultimately be adjacent to the polymer electrolyte membrane is suitably from 1 µm to 10 µm.

The gas diffusion substrates may be any suitable gas diffusion substrates known to those skilled in the art. Typical substrates include substrates based on carbon paper (e.g. Toray® paper available from Toray Industries, Japan), woven carbon cloths (e.g. Zoltek® PWB-3 available from Zoltek Corporation, USA) or non-woven carbon fibre webs (e.g. Optimat 203 available from Technical Fibre Products, UK). The carbon substrate is typically modified with a particulate material either embedded within the substrate or coated onto the planar faces, or a combination of both. The particulate material is typically a mixture of carbon black and a polymer such as polytetrafluoroethylene (PTFE). Suitably the gas diffusion substrates are between 150 and 300 µm thick. Preferably there is a layer of particulate material such as carbon black and PTFE on the faces of the gas diffusion substrates that contact the electrocatalyst layers.

The polymer electrolyte membrane may be any type of ion-conducting membrane known to those skilled in the art. Suitably the membrane is proton-conducting. In state of the art membrane electrode assemblies, the membranes are often based on perfluorinated sulphonic acid materials such as Nafion® (DuPont), Flemion® (Asahi Glass) and Aciplex® (Asahi Kasei). The membrane may be a composite membrane, containing the proton-conducting material and other materials that confer properties such as mechanical strength. For example, the membrane may comprise a proton-conducting membrane and a matrix of silica fibres, as described in EP 875 524. The membrane is suitably less than 200 μm thick, preferably less than 50 μm thick.

The electrocatalyst layers comprise an electrocatalyst which may be a finely divided metal powder (metal black), or may be a supported catalyst wherein small metal particles are dispersed on electrically conducting particulate carbon supports. The electrocatalyst metal is suitably selected from
  (i) the platinum group metals (platinum, palladium, rhodium, ruthenium, iridium and osmium),
  (ii) gold or silver,
  (iii) a base metal,
or an alloy or mixture comprising one or more of these metals or their oxides. The preferred electrocatalyst metal is platinum, which may be alloyed with other precious metals such as ruthenium, or base metals such as molybdenum or tungsten. If the electrocatalyst is a supported catalyst, the loading of metal particles on the carbon support material is suitably in the range 10-100 wt %, preferably 15-75 wt %.

The electrocatalyst layers suitably comprise other components, such as ion-conducting polymer, which is included to improve the ionic conductivity within the layer. To incorporate the layers into the membrane electrode assembly, the layers can be formed on the gas diffusion substrates, or the layers can be formed on the membrane.

The electrocatalyst layers are preferably not in contact with the regions of the gas diffusion substrates that are impregnated with the adhesive layer of the encapsulation film. This is because any electrocatalyst in this region will be outside the electrochemically active are of the MEA and will not be able to take part in the electrochemical reactions. Additionally, if gaseous reactants can reach the catalyst outside the active area there is a risk of heterogeneous gas phase reactions and resultant pin-holing of the membrane.

In a first embodiment of the invention, the encapsulation films are positioned on the outer faces of the gas diffusion substrates, i.e. the faces that are remote from the membrane. The backing layer is adjacent to and suitably contacts the outer face of the gas diffusion substrate and the adhesive layer impregnates the substrate from the outer face towards the membrane. In this embodiment, the encapsulation films can be used to seal the edge region of the MEA and the backing layer can provide a surface which is suitable for supporting a gasket. To seal the MEA, the adhesive layer of the encapsulation film suitably bonds to the membrane.

The membrane is located between the gas diffusion substrates and preferably extends beyond the substrates so that the adhesive layers can bond directly to the protruding membrane. The membrane suitably protrudes beyond the gas diffusion substrates by between 0.5 mm and 40 mm, preferably between 0.5 mm and 5 mm and most preferably between 0.5 mm and 2 mm. Alternatively, the membrane can be coextensive with or inboard of the gas diffusion substrates. If the membrane does not extend beyond the substrates and it is desired to seal the edge region of the MEA, the adhesive layer must impregnate through the entire thickness of the substrate and bond to the membrane.

The encapsulation films suitably extend beyond the edges of the gas diffusion substrates and, if the membrane protrudes, preferably beyond the edges of the membrane such that the adhesive layers of the two encapsulation films can bond to one another, thus enveloping the membrane edge and substrate edges.

In this first embodiment, the MEA suitably further comprises one or more gaskets that are positioned on the backing layer of the encapsulation film. The backing layer reinforces the edge region of the MEA so the gaskets can be compressed against this region with little risk of damage. The gaskets will ultimately be compressed against a field flow plate. The gaskets are suitably formed from a resilient material that, after compression, is capable of reverting back to form its original shape. Suitably, the gaskets are formed from a polymeric material. Preferred gasket materials may include elastomers/rubbers (e.g. ethylene propylene rubber), fluoroelastomers (e.g. Viton™ (DuPont Dow Elastomers)), chloroelastomers (e.g. polychloroprene, chlorosulphonated polyethylene), thermoplastic elastomers (e.g. Kraton™ or Dynaflex™ (GLS Corp)), fluorosilicones (e.g. fluoroalkyl polysiloxane), silicone rubber or thermoplastics (e.g. ethylene vinyl acetate, fluorinated ethylene propylene copolymers or Santoprene™ (Bayer)). Suitably the gasket may be pre-formed and attached to the MEA or may be formed in situ.

In a second embodiment of the invention, the encapsulation films are positioned on the inner faces of the gas diffusion substrates, i.e. the faces that are by the membrane. The backing layer suitably contacts the inner face of the gas diffusion substrate and the adhesive layer impregnates the substrate from the inner face towards the outer face. In this embodiment, the encapsulation film forms a barrier between the edge regions of the gas diffusion substrates and the membrane. This is advantageous because it prevents fibres from the gas diffusion substrates from puncturing the membrane material and creating electrical contacts across the membrane. If there is electrical shorting across the membrane, the performance of the MEA will be decreased and there is potential for damage to the membrane. Furthermore, if the membrane is punctured, there will be a greater tendency for reactant gas crossover, which will lead to heterogeneous gas phase reactions, heating and further damage to the membrane.

The encapsulation film may have only one adhesive layer, and this must impregnate the substrate from the inner face towards the outer face. In this case, the backing layer directly contacts the membrane and there is no adhesion between the encapsulation film and the membrane. An advantage of this is that the membrane can change in size without the constraint of being adhered to the backing layer. Suitably, the thickness of the backing film is the same as the thickness of the electrocatalyst layer to prevent contact losses. Alternatively, the encapsulation film may have two adhesive layers, so that a first adhesive layer can impregnate the substrate, and a second adhesive layer can adhere to the membrane. An advantage of this is that there is an effective seal between the membrane and the encapsulation film. Suitably the thickness of the second adhesive layer is less than the thickness of the first adhesive layer. Preferably, the thickness of the second adhesive layer is between 0.1 and 20 μm thick, more preferably between 1-10 μm thick. Most preferably the combined thickness of the backing layer and the second adhesive layer is the same as the thickness of the electrocatalyst layer.

Positioning encapsulation films on the inner faces of the gas diffusion substrates provides mechanical reinforcement to the edge regions of the MEA. Suitably, the membrane and the encapsulation films extend beyond the gas diffusion substrates so that around the periphery of the MEA there is a region of membrane that is in contact with encapsulation film. A region of membrane and encapsulation film is stronger than a similar region without encapsulation film, so provides a suitable surface against which a gasket may be placed.

Encapsulation films located on the inner faces of the gas diffusion substrates can seal the gas diffusion substrates if adhesive layers impregnate through the entire thickness of the substrates. Alternatively, adhesive layers may impregnate only part way through the thickness of the substrates, e.g. between 20-60% of the thickness, and the remaining portions of the substrates (i.e. the portions between the regions impregnated by adhesive and the outer faces) may be impregnated with an elastomeric material. Suitable elastomeric materials include silicones, fluorosilicones, fluoroelastomers (e.g. Viton), EPDM (ethylene propylene diene monomer) rubbers, thermoplastic elastomers (e.g. styrene-butadiene block copolymer) and liquid crystal polymer elastomers. The elastomeric material may also be present on the outer face of the substrate and preferably forms gasketing members.

In a third embodiment of the invention, encapsulation films are positioned on the outer faces of the gas diffusion substrates as described for the first embodiment of the invention and further encapsulation films are positioned on the inner faces of the gas diffusion substrates as described for the second embodiment of the invention. The encapsulation films thus provide sealing, reinforcement and a barrier between the substrate edges and the membrane.

There are a number of methods that can be used to prepare the membrane electrode assemblies according to the invention. In one method, encapsulation films can be applied to a pre-formed five layer laminated membrane electrode assembly, thereby sealing the membrane electrode assembly. The present invention provides a method of sealing a membrane electrode assembly comprising the following steps:
a) providing a five layer laminated membrane electrode assembly comprising a membrane, electrocatalyst layers disposed on either side of the membrane, and gas diffusion substrates in contact with the electrocatalyst layers;
b) providing two encapsulation films, each comprising a backing layer and an adhesive layer, and placing the encapsulation films next to the edges of the outer faces of the gas diffusion substrates, with the adhesive layer facing the gas diffusion substrate; and
c) pressing the encapsulation films such that the adhesive layer impregnates the gas diffusion substrates and bonds to the membrane.

If the membrane protrudes beyond the gas diffusion substrates, it may be necessary for the method to have a further step:
a) pressing the encapsulation films so that they bond to the protruding membrane.

If the adhesive is a hot-melt adhesive, the pressing steps must be carried out above the melt temperature of the adhesive. The appropriate pressure will depend on the materials being used, but is likely to be in the range of 50-250 psi.

In a second method, encapsulation films can be applied to the gas diffusion substrates whilst at the same time the membrane, electrocatalyst layers and gas diffusion substrates are laminated to form the membrane electrode assembly. A sealed and/or reinforced membrane electrode assembly is produced from its component parts in a single pressing step. This method of producing a sealed and/or reinforced membrane electrode assembly comprises the following steps:

a) providing an unlaminated five layer assembly comprising a membrane, electrocatalyst layers in contact with either side of the membrane, and gas diffusion substrates in contact with the electrocatalyst layers;
(b) providing encapsulation films, each comprising a backing layer and an adhesive layer, and placing the encapsulation films next to the edges of the outer and/or inner faces of the gas diffusion substrates, with the adhesive layer(s) facing the gas diffusion substrate; and
(c) pressing the encapsulation films and the unlaminated five layer assembly to form a laminated membrane electrode assembly wherein the adhesive layer(s) impregante the gas diffusion substrate.

The unlaminated five layer assembly may comprise a membrane interposed between two gas diffusion electrodes, a catalyst coated membrane interposed between two gas diffusion substrates, or a membrane with one catalysed face interposed between one gas diffusion electrode and one gas diffusion substrate. To produce a sealed membrane electrode assembly by this method, encapsulation films should be placed next to the outer edges of the encapsulation films, and the adhesive layers should impregnate the gas diffusion substrates and bond to the membrane.

The pressure must be sufficient to laminate the elements of the five layer assembly and is suitably in the range 50-250 psi.

In a third method, encapsulation films can be applied to the gas diffusion substrates before the substrates are combined with the membrane and electrocatalyst layers, i.e. two pressing steps are required to form the membrane electrode assembly. The present invention therefore provides a gas diffusion substrate wherein encapsulation film, comprising a backing layer and an adhesive layer, is positioned on the edges of a face of the gas diffusion substrate such that the adhesive layer impregnates into the gas diffusion substrate. An electrocatalyst layer can be applied to the gas diffusion substrate before or after the encapsulation film is applied to the gas diffusion substrate. Therefore, the present invention further provides a gas diffusion electrode comprising an electrocatalyst layer deposited on a gas diffusion substrate, wherein an encapsulation film, comprising a backing layer and an adhesive layer, is positioned on the edges of a face of the gas diffusion substrate such that the adhesive layer impregnates into the gas diffusion substrate. A sealed and/or reinforced membrane electrode assembly is produced by a process comprising the following steps:
a) providing encapsulation films, each comprising a backing layer and an adhesive layer, and placing the encapsulation films next to the edges of gas diffusion substrates, with the adhesive layer(s facing the gas diffusion substrates;
b) pressing the encapsulation films to impregnate the adhesive layer(s) into the gas diffusion substrates;
c) preparing an unlaminated five layer assembly comprising a membrane, electrocatalyst layers in contact with either side of the membrane, and the impregnated gas diffusion substrates in contact with the electrocatalyst-layers; and
d) pressing the unlaminated five layer assembly to form a laminated membrane electrode assembly.

The unlaminated five layer assembly may comprise a membrane interposed between two gas diffusion electrodes, a catalyst coated membrane interposed between two gas diffusion substrates, or a membrane with one catalysed face interposed between one gas diffusion electrode and one gas diffusion substrate. The encapsulation films may be on the inner faces and/or the outer faces of the gas diffusion substrates when the substrates, membrane and electrocatalyst layers are assembled to form the unlaminated five layer assembly.

A method for preparing a membrane electrode assembly wherein the adhesive layers impregnate only part way through the thickness of the substrates and the remaining portions of the substrates are impregnated with an elastomeric material, comprises a further step of:

placing the laminated membrane electrode assembly in a mould and forming a moulded region of elastomeric material around the edge of the membrane electrode assembly, such that the elastomeric material impregnates into a portion of the substrate.

The moulded region may be formed using injection moulding or compression moulding.

Figure 1:
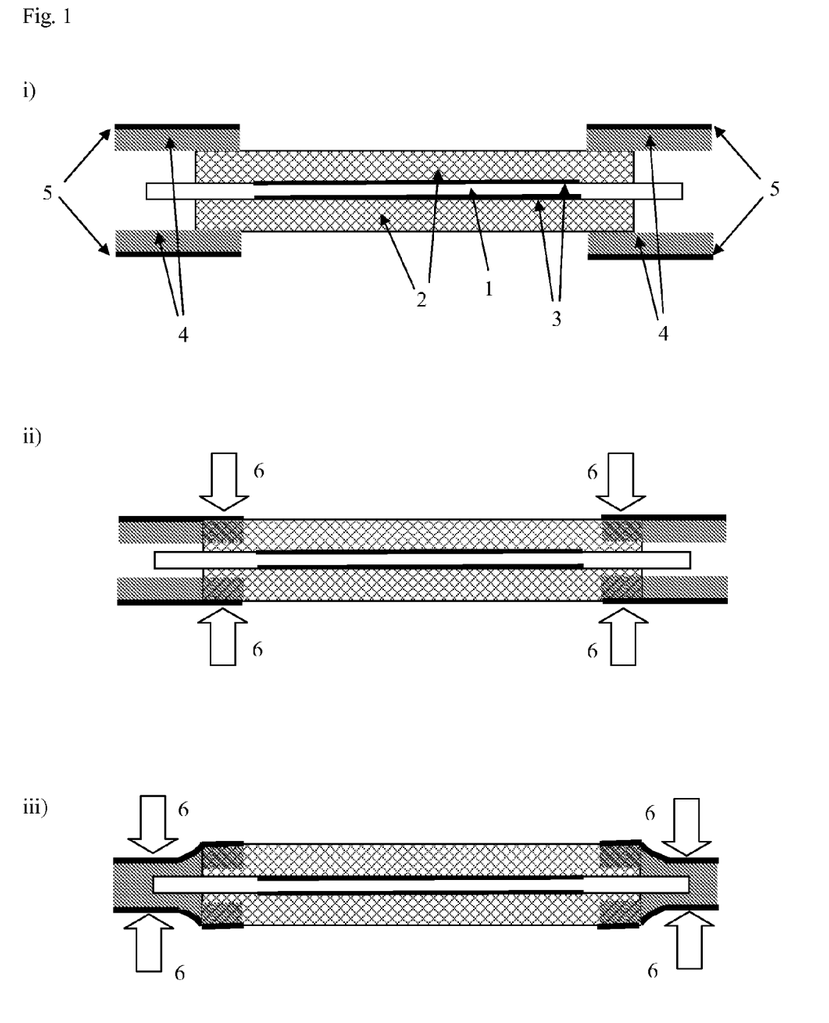
FIG. 1 is a schematic diagram showing a method of sealing a membrane electrode assembly according to the invention.

Step (i) of FIG. 1 shows a five-layer laminated membrane electrode assembly comprising a membrane (1), two gas diffusion substrates (2) and two electrocatalyst layers (3). The electrocatalyst layers (3) do not contact the entire substrate area. The membrane (1) extends beyond the substrates (2). Encapsulation films comprising a backing layer (5) and an adhesive layer (4) are positioned on the edges of the outer faces of the substrates (2). In step (ii) the encapsulation films are hot pressed (6) at the positions shown by arrows, and the adhesive layer impregnates into the gas diffusion substrates. The electrocatalyst layers do not extend as far as the impregnated region of the substrate so all the electrocatalyst can be in the electrochemically active area of the MEA. In step (iii) the encapsulation films undergo a further hot pressing (6) at the positions indicated by arrows so that the adhesive bonds to the protruding membrane. The encapsulation film extends beyond the protruding membrane so in step (iii) the protruding membrane is enveloped by the adhesive.

Figure 2:
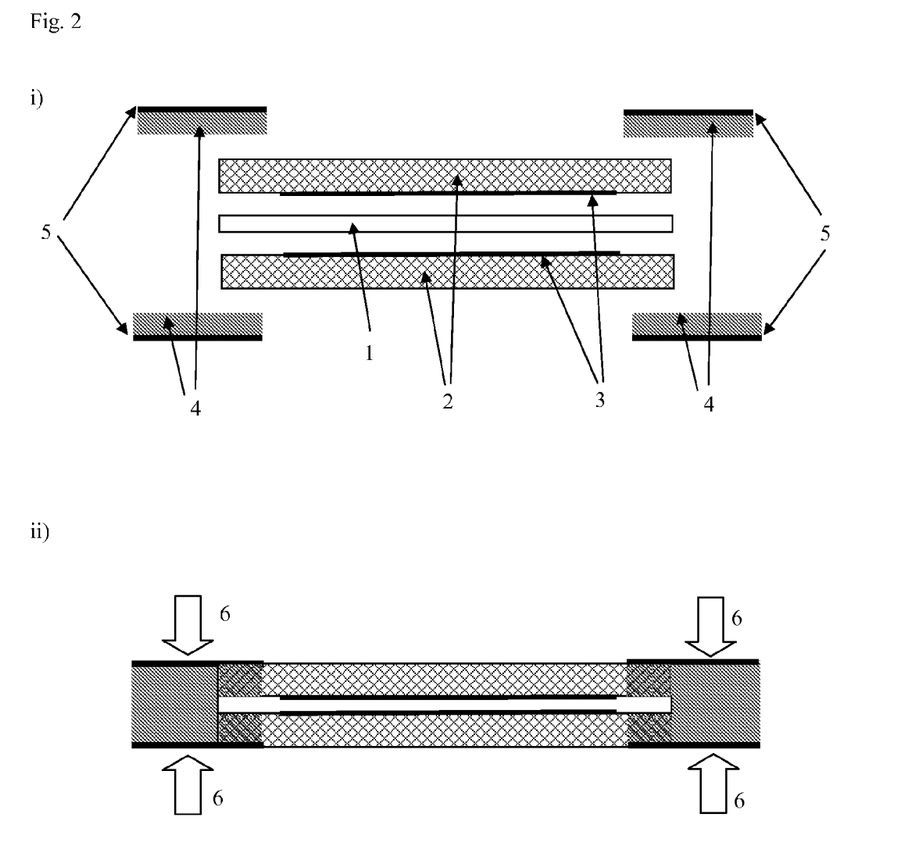
FIG. 2 is a schematic diagram showing a method of producing a sealed membrane electrode assembly according to the invention.

Step (i) of FIG. 2 shows a membrane (1) between two gas diffusion electrodes comprising gas diffusion substrates (2) and electro catalyst layers (3). The membrane (1) is coextensive with the gas diffusion substrates (2), but the electrocatalyst layers (3) do not contact the entire substrate area. Encapsulation films comprising backing layers (5) and adhesive layers (4) are positioned on the edges of the outer faces of the substrates (2). In step (ii) the encapsulation films are hot pressed (6) at the positions shown by arrows. The gas diffusion electrodes are laminated to the membrane, the adhesive layer impregnates through the entire thickness of the gas diffusion substrates and bonds to the membrane, and the adhesive layers of the opposing encapsulation films are bonded to each other.

Figure 3:
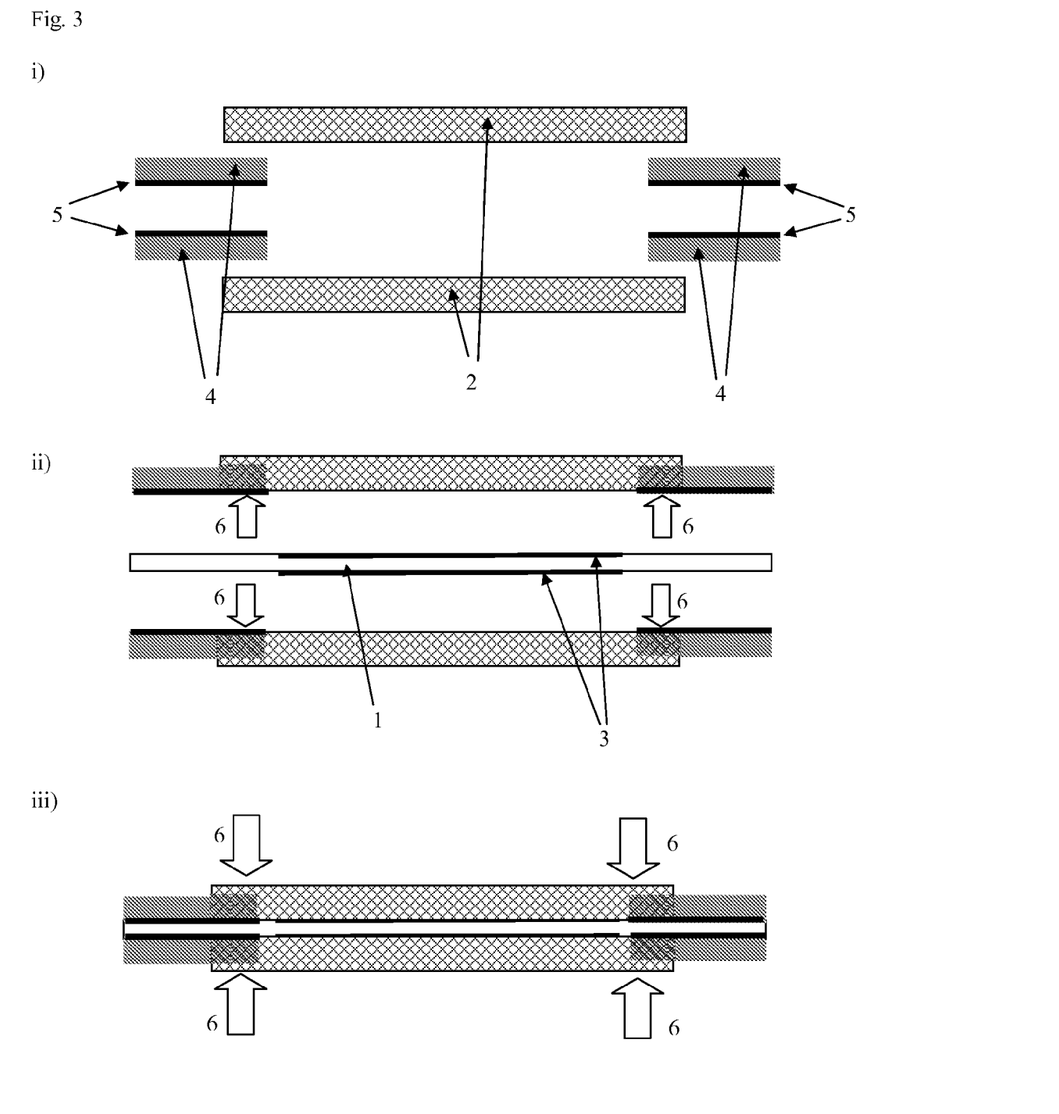
FIG. 3 is a schematic diagram showing a method of producing a reinforced membrane electrode assembly according to the invention.

Step (i) of FIG. 3 shows gas diffusion substrates (2) and encapsulation films comprising backing layers (5) and adhesive layers (4) positioned on the edges of the inner faces of the substrates (2). In step (ii) the encapsulation films are hot pressed (6) at the positions shown by arrows and the adhesive layers (4) impregnate into the gas diffusion substrates (2). A catalyst coated membrane comprising a membrane (1) and two electrocatalyst layers (3) is positioned between the gas diffusion substrates (2). The membrane (1) extends beyond the gas diffusion substrates (2). In step (iii) the gas diffusion substrates (2) are laminated to the catalyst coated membrane (1, 3) by hot pressing (6) at the positions shown by arrows.

Figure 4:
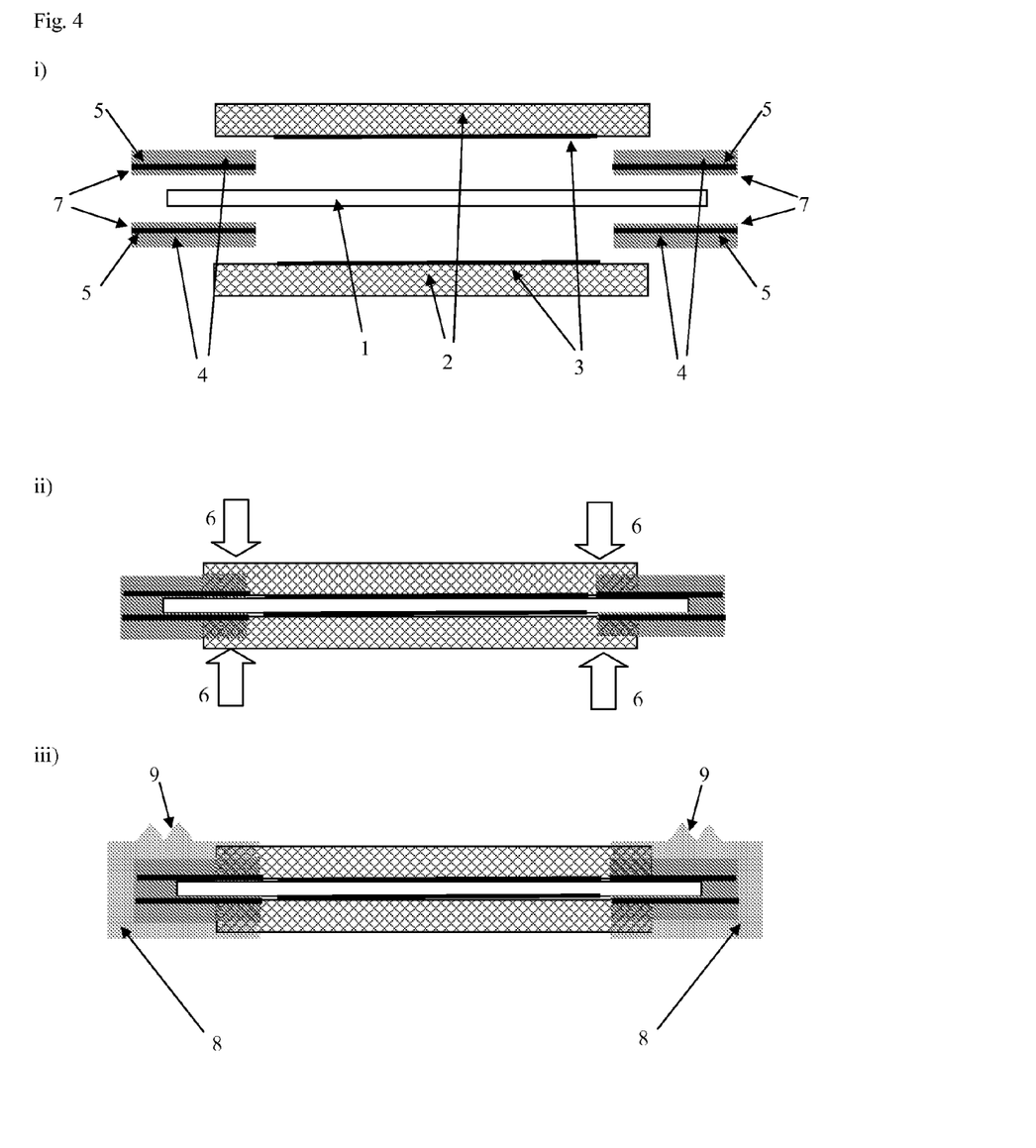
FIG. 4 is a schematic diagram showing a method of producing a sealed and reinforced membrane electrode assembly according to the invention.

Step (i) of FIG. 4 shows a membrane (1) between two gas diffusion electrodes comprising gas diffusion substrates (2) and electrocatalyst layers (3). The electrocatalyst layers (3) do not contact the entire substrate area. The membrane (1) extends beyond the substrates (2). Encapsulation films comprising backing layers (5), first adhesive layers (4) and second adhesive layers (7) are positioned on the edges of the inner faces of the substrates (2). In step (ii) the encapsulation films are hot pressed (6) at the positions shown by arrows. The gas diffusion electrodes are laminated to the membrane, the first adhesive layers (4) impregnate into the gas diffusion substrates (2) and the second adhesive layers (7) adhere to the membrane. The encapsulation films extend beyond the edge of the membrane, and the region between the backing layers (5) is filled by adhesive. In step (iii) an elastomeric material is moulded onto the membrane electrode assembly so that elastomeric material (8) impregnates the gas diffusion substrates (2) and envelopes the edges of the substrates (2) and the encapsulation films (4,5,7). The elastomeric material also forms gasket members (9).

Figure 5:
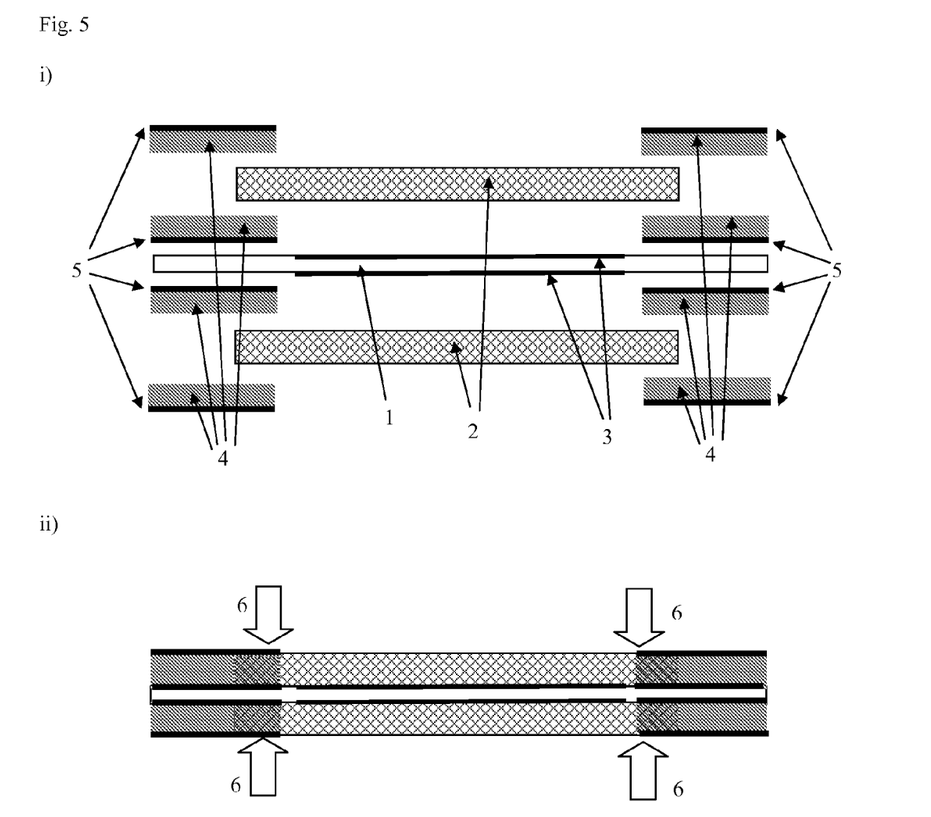
FIG. 5 is a schematic diagram showing a method of producing a sealed and reinforced membrane electrode assembly according to the invention.

Step (i) of FIG. 5 shows a catalyst coated membrane comprising a membrane (1) and two electrocatalyst layers (3). Gas diffusion substrates (2) are positioned either side of the catalyst coated membrane. The membrane (1) extends beyond gas diffusion substrates (2). The electrocatalyst layers (3) do not contact the entire substrate area. Encapsulation films comprising backing layers (5) and adhesive layers (4) are positioned on the edges of the inner faces and the outer faces of the substrates (2). In step (ii) the encapsulation films are hot pressed (6) at the positions shown by arrows. The gas diffusion substrates are laminated to the catalyst coated membrane, the adhesive layers impregnate into the gas diffusion substrates and bond to one another. Backing layers (5) are present on the outer faces of the gas diffusion substrates (2) and between the inner faces of the gas diffusion substrates (2) and the membrane (1).

EXAMPLES

The invention will now be described by reference to examples that are illustrative and not limiting of the invention.

Example 1

An MEA was prepared from two 200 μm Toray® TGP-H-060 gas diffusion substrates (each with a carbon black/PTFE base layer across one face except for a 1 cm border region around the edge) and a 30 μm Flemion® SH-30 membrane. Catalyst layers comprising carbon-supported Platinum catalysts and Nafion® ionomer were applied to the two substrates, on top of the base layer. The catalysed substrates and the membrane were combined in a lamination process. The two substrates had the same dimensions and the membrane extended beyond the edges of the substrates by 1 mm.

Encapsulation films (purchased from Morane Ltd, UK) were placed adjacent to the outer edge of the MEA and were applied in a two-step pressing process as shown in FIG. 1. In a first step, the encapsulation film was pressed onto the substrates at a pressure of 100 psi for 30 s. In a second step, the encapsulation film was bonded onto the protruding membrane at a pressure of 200 psi for 1 minute. Both steps were carried out at 95° C. The backing layer of the film was a 20 μm polyester layer and the adhesive layer was a 55 μm polyethylene layer.

The encapsulation film extended beyond the edge of the protruding membrane so the two adhesive layers bonded together. After the two-step pressing process the edges of the encapsulation film were trimmed.

The MEA was placed in hot water (80° C.) for 288 hours and was leak tested every 48 hours. For the leak test the MEA was placed between two stainless steel plates. An inlet pipe was attached to one plate and could be used to supply air to the MEA. An outlet pipe was attached to the second plate. Both pipes contained a valve. An in-plane leak test was carried out to ascertain whether gases could leak out of the edges of the MEA. The valve in the outlet pipe was closed and air at 3 psi was applied through the inlet pipe. The pressure did not fall, indicating that no gas was leaking out through the edges of the MEA. A through-plane leak test was carried out to ascertain whether gases could leak across the MEA. 3 psi of nitrogen was applied through the inlet pipe and the valve on the outlet pipe was opened. The amount of gas leaving through the outlet pipe was measured. It is expected that a certain amount of gas will travel across the MEA because the membrane has an intrinsic gas permeability. The amount of gas leaving through the outlet pipe was consistent with the calculated level of gas that was expected to permeate through the membrane, implying that the MEA had no additional leakage paths such as pin-holes.

Example 2

Example 1 was repeated except that the encapsulation film had a 30 μm polyester backing layer and a 55 μm polyethylene adhesive layer. Leak tests showed that the MEA was sealed.

Example 3

Example 1 was repeated except that the encapsulation film had a 20 μm BOPP backing layer and a 105 μm polyethylene adhesive layer. Leak tests showed that the MEA was sealed.

Example 4

An MEA was prepared from two 200 μm Toray® TGP-H-060 gas diffusion substrates (each with a carbon black/PTFE base layer across one entire face) and a 30 μm Flemion® SH-30 membrane. Catalyst layers comprising carbon-supported Platinum catalysts and Nafion® ionomer were applied to the two substrates, on top of the base layer, but leaving an uncatalysed border around the substrate edge. Encapsulation film having a 12 μm polyester backing layer and a 30 μm polyethylene adhesive layer was positioned between the catalysed substrates and the membrane so that the backing layer contacted the membrane. The catalysed substrates, encapsulation film and the membrane were combined by pressing at above 200 psi at 150° C. for 2 minutes. The two substrates had the same dimensions and the membrane extended beyond the edge of the substrates by 30 mm. The encapsulation film extended to the edge of the membrane and 5 mm across the substrates. The edges of the reinforced MEA were trimmed before it was assembled into a fuel cell.

The MEA was sandwiched between two field flow plates with gaskets adjacent to the bottom field flow plates, and assembled in a fuel cell. Electrical shorting across the MEA was measured by connecting the cell to a potentiostat, applying 0.3V across the cell and measuring the current. The resistance was calculated from the current and can be seen in table 1.

Comparative Example 1

Example 4 was repeated except that no encapsulation film was incorporated into the MEA.

Example 5

Example 4 was repeated except that the membrane was a 30 μm composite membrane containing Flemion® polymer and amorphous silica fibres.

Comparative Example 2

Example 5 was repeated except that no encapsulation film was incorporated into the MEA.

Resistance Measurements

Table 1 shows the resistance measurements for Examples 4 and 5 and Comparative Examples 1 and 2. It is clear that including the encapsulation film in the MEA on the inner face of the substrate reduces electrical shorting across the MEA.

TABLE 1

|  | Resistance ($\Omega cm^2$) |
|---|---|
| Example 4 | 13,107 |
| Comparative Example 1 | 1000-2000 |
| Example 5 | 8,500 |
| Comparative Example 2 | 500-1000 |

What is claimed:

1. A gas diffusion electrode comprising an electrocatalyst layer deposited on a gas diffusion substrate, wherein an encapsulation film, comprising a backing layer and an adhesive layer, is positioned on the edges of a face of the gas diffusion substrate such that the adhesive layer impregnates only part way through the thickness of the gas diffusion substrate and wherein the adhesive layer comprises a hot-melt adhesive.

2. A gas diffusion electrode according to claim 1, wherein the backing layer contacts the face of the gas diffusion substrate.

3. A gas diffusion electrode according to claim 1, wherein the thickness of the backing layer is between 5 μm and 50 μm.

4. A gas diffusion electrode according to claim 1, wherein the thickness of the adhesive layer is from 1 μm to 300 μm.

5. A gas diffusion electrode according to claim 1, wherein the encapsulation film is positioned on the outer face of the gas diffusion substrate.

6. A gas diffusion electrode according to claim 5, wherein the encapsulation film extends beyond the edge of the gas diffusion substrate.

7. A gas diffusion electrode according to claim 1, wherein the encapsulation film is positioned on the inner face of the gas diffusion substrate.

8. A gas diffusion electrode according to claim 7, wherein the encapsulation film has only one adhesive layer.

9. A gas diffusion electrode according to claim 8, wherein the thickness of the backing film is approximately the same as the thickness of the electrocatalyst layer.

10. A gas diffusion electrode according to claim 7, wherein the encapsulation film has two adhesive layers, wherein a first adhesive layer impregnates the substrate and a second layer faces away from the substrate.

11. A gas diffusion electrode according to claim 10, wherein the combined thickness of the backing layer and the second adhesive layer is the same as the thickness of the catalyst layer.

12. A gas diffusion electrode according to claim 7, wherein the adhesive layer impregnates only part way through the thickness of the substrate and the remaining portions of the substrate is impregnated with an elastomeric material.

13. A gas diffusion electrode according to claim 1, wherein encapsulation films are positioned on the outer and on the inner faces of the gas diffusion substrate.

14. A gas diffusion electrode according to claim 1, wherein the adhesive layer comprises an adhesive selected from the group consisting of polyethylene-based and polypropylene-based adhesives.

15. A gas diffusion electrode according to claim 1, wherein the adhesive layer comprises an adhesive selected from the group consisting of a copolymer of ethylene and methacrylic acid and a copolymer of ethylene and vinyl acetate.

* * * * *